(12) United States Patent
Cruickshank et al.

(10) Patent No.: US 7,739,668 B2
(45) Date of Patent: Jun. 15, 2010

(54) METHOD AND SYSTEM OF PROFILING APPLICATIONS THAT USE VIRTUAL MEMORY

(75) Inventors: Brian Cruickshank, Oakville (CA); Oliver P. Sohm, Toronto (CA)

(73) Assignee: Texas Instruments Incorporated, Dallas, TX (US)

( * ) Notice: Subject to any disclaimer, the term of this patent is extended or adjusted under 35 U.S.C. 154(b) by 1018 days.

(21) Appl. No.: 11/383,430

(22) Filed: May 15, 2006

(65) Prior Publication Data

US 2006/0259825 A1 Nov. 16, 2006

Related U.S. Application Data

(60) Provisional application No. 60/681,427, filed on May 16, 2005, provisional application No. 60/681,542, filed on May 16, 2005, provisional application No. 60/681,561, filed on May 16, 2005.

(51) Int. Cl.
*G06F 9/44* (2006.01)
*G06F 9/45* (2006.01)

(52) U.S. Cl. .................... 717/128; 711/170

(58) Field of Classification Search ......... 717/174–175, 717/124–132; 711/108, 170, 173
See application file for complete search history.

(56) References Cited

U.S. PATENT DOCUMENTS

| | | | | |
|---|---|---|---|---|
| 5,870,611 A * | 2/1999 | Shrader et al. | ............... | 717/175 |
| 5,930,830 A * | 7/1999 | Mendelson et al. | ......... | 711/171 |
| 6,513,155 B1 * | 1/2003 | Alexander et al. | ......... | 717/124 |
| 6,519,766 B1 * | 2/2003 | Barritz et al. | ............. | 717/130 |
| 6,523,102 B1 * | 2/2003 | Dye et al. | ................. | 711/170 |
| 6,553,564 B1 * | 4/2003 | Alexander et al. | ......... | 717/128 |
| 6,634,020 B1 * | 10/2003 | Bates et al. | ................. | 717/131 |
| 6,728,949 B1 * | 4/2004 | Bryant et al. | ............... | 717/127 |
| 6,754,856 B2 * | 6/2004 | Cofler et al. | ................. | 714/53 |
| 6,865,157 B1 * | 3/2005 | Scott et al. | .................. | 370/242 |
| 6,871,341 B1 * | 3/2005 | Shyr | ......................... | 717/131 |
| 6,901,581 B1 * | 5/2005 | Schneider | ................... | 717/124 |
| 6,976,252 B2 * | 12/2005 | White et al. | ................ | 717/174 |
| 6,988,263 B1 * | 1/2006 | Hussain et al. | ............. | 717/128 |
| 7,024,660 B2 * | 4/2006 | Andrade et al. | ............ | 717/124 |
| 7,089,537 B2 * | 8/2006 | Das et al. | .................... | 717/132 |

(Continued)

OTHER PUBLICATIONS

Baskaran et al, "Automatic data movement and computation mapping for multi level parallel architecture with explictly managed memories", ACM PPpOO, pp. 1-10, 2008.*

(Continued)

*Primary Examiner*—Anil Khatri
(74) *Attorney, Agent, or Firm*—Robert D. Marshall, Jr.; W. James Brady; Frederick J. Telecky, Jr.

(57) ABSTRACT

A method and system of profiling applications that use virtual memory. At least some of the illustrative embodiments are methods comprising executing a traced program on a target system (the traced program comprising a plurality of tasks, each task using a different virtual to physical memory mapping), obtaining values indicative of a plurality of states of virtual to physical memory mapping used by a memory management unit associated with a processor of a target system, and displaying an indication of a proportion of an execution time the processor of the target system dedicated to each of a plurality of tasks during the execution time.

23 Claims, 4 Drawing Sheets

U.S. PATENT DOCUMENTS

| | | | | |
|---|---|---|---|---|
| 7,146,611 | B1 * | 12/2006 | Phillips | 717/174 |
| 7,257,805 | B2 * | 8/2007 | Gritter | 717/129 |
| 7,263,690 | B1 * | 8/2007 | Shapiro | 717/128 |
| 7,293,142 | B1 * | 11/2007 | Xu et al. | 711/124 |
| 7,487,321 | B2 * | 2/2009 | Muthiah et al. | 711/170 |
| 7,536,680 | B2 * | 5/2009 | Berry et al. | 717/130 |
| 7,581,211 | B2 * | 8/2009 | Babineau et al. | 717/131 |
| 7,584,458 | B2 * | 9/2009 | Das et al. | 717/126 |

OTHER PUBLICATIONS

Bao et al, "HMTT: A platform independent full system memory trace monitoring system", ACM SIGMETRICS, pp. 229-240, 2008.*

Jones et al, "Improving the scalability of parallel job by adding parallel awareness to the operating system", ACM/IEEE SC, pp. 1-20, 2003.*

Lee et al, "A flexible memory mapping scheme for parallel turbo decoders with periodic interleavers", IEEE, pp. 651-654, 2007.*

Millard et al, "Run time support and storage management for memory mapped persistent object", IEEE, pp. 508-515, 1993.*

Lee et al, "Matching output queueing with multiple input/output queued switch", IEEE, pp. 121-132, 2006.*

Swain, Andrew and Horley, John; "ARM Summary of New Features in ETMv3"; Jan. 31, 2005; 14 pp.; Document no. PRD08-PRDC-003049 3 2; © ARM Limited 2004-2005.

"ETM 10 (Rev 0) Technical Reference Manual"; 94 pp; Document No. ARM DDI 0206A; © 2001 ARM Limited.

* cited by examiner

METHOD AND SYSTEM OF PROFILING APPLICATIONS THAT USE VIRTUAL MEMORY

CROSS-REFERENCE TO RELATED APPLICATIONS

This application claims the benefit of Provisional Application Ser. No. 60/681,427 filed May 16, 2005, entitled "Debugging Software-Controlled Cache Coherence;" and Provisional Application Ser. No. 60/681,542, filed May 16, 2005, titled "Debug Profiling Applications," and Provisional Application Ser. No. 60/681,561 filed May 16, 2005, titled "Debugging Applications with Overlays, Run-Time Relocatable Code and Multi-Tasking," all of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data. The trace data may comprise data such as the sequence of addresses executed by the processor, values of various processor registers at each executed instruction, and information in log files written by the traced program. The addresses of executed instructions are later correlated to the actual programs so that the opcodes executed at each instruction may be displayed for the user. In systems using virtual memory addressing, however, different tasks execute from the same set of virtual memory addresses making correlating the actual programs to the addresses of the executed instructions difficult.

SUMMARY

The problems noted above are solved in large part by a method and system of profiling applications that use virtual memory. At least some of the illustrative embodiments are a computer-readable medium storing a program that, when executed by a processor of a host system, causes the processor to obtain values indicative of a plurality of states of virtual to physical memory mapping used by a memory management unit associated with a processor of a target system, and display an indication of a proportion of an execution time the processor of the target system dedicated to each of a plurality of tasks during the execution time, each task associated with a particular state of the virtual to physical memory mapping.

Other illustrative embodiments are methods comprising executing a traced program on a target system (the traced program comprising a plurality of tasks, each task using a different virtual to physical memory mapping), obtaining values indicative of a plurality of states of virtual to physical memory mapping used by a memory management unit associated with a processor of a target system, and displaying an indication of a proportion of an execution time the processor of the target system dedicated to each of a plurality of tasks and, optionally, some or all of the functions executed by those tasks during the execution time.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
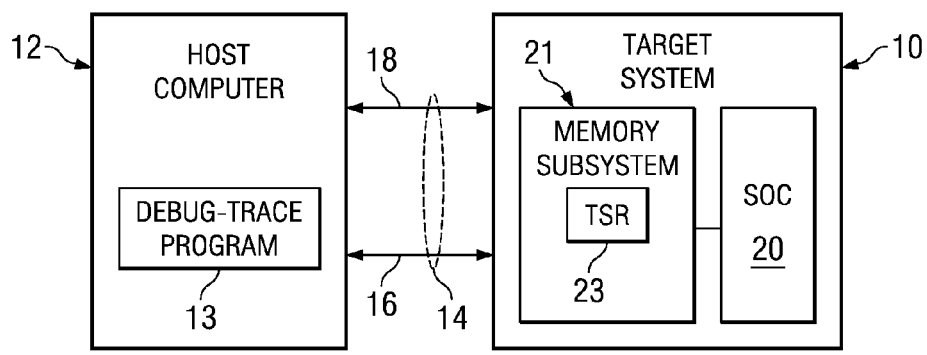
FIG. 1 shows a system in accordance with embodiments of the invention.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer stores and executes a program that is used to debug, and in some cases gather trace data and produce trace data displays, and thus is referred to herein as a debug-trace program 13.

The host computer 12 and target system 10 couple by way of one or more interconnects 14, such as cables. In some embodiments, the host computer 12 couples to target system 10 by way of a multi-pin cable 16, such as a Mictor cable available from Tektronix Texas, LLC of Richardson, Tex. The multi-pin cable 16 enables transfer of trace data files from the target system 10 to the host computer 12. In alternative embodiments, the host computer 12 couples to the target system 10 by way of a serial cable 18 across which the host computer 12 communicates with the joint test action group (JTAG) communication system, or other currently existing or after developed serial communication system. Serial communication between the host computer 12 and target system 10 on serial cable 18 has lower bandwidth than a multi-pin connection through illustrative cable 16. Thus, in embodiments that rely exclusively on the JTAG-based communications over serial cable 18, rather than trace or capture every event of a processor within a particular time frame, the statistical sampling subsystem (discussed more fully below) of the target system 10 is configured to statistically sample pertinent data, and transfer the statistically sampled data across the serial cable 18. In yet still further alternative embodiments, the multi-pin cable 16 may have two or more pins dedicated to serial communication, and thus the host computer 12 and target system 10 may communicate using multiple protocols, yet over the same multi-pin cable 16. In yet still other embodiments, the trace data may be captured on the target system and transferred to the host computer by any of a variety of now existing or after developed transport protocols, which allow the host computer to interact over a distance such that the host computer and target system need not be co-located (e.g., Ethernet, transmission control protocol/internet protocol (TCP/IP), institute of electrical and electronic engineers (IEEE) 1391 protocol, RS-232, and peripheral components interconnect (PCI)).

Figure 2:
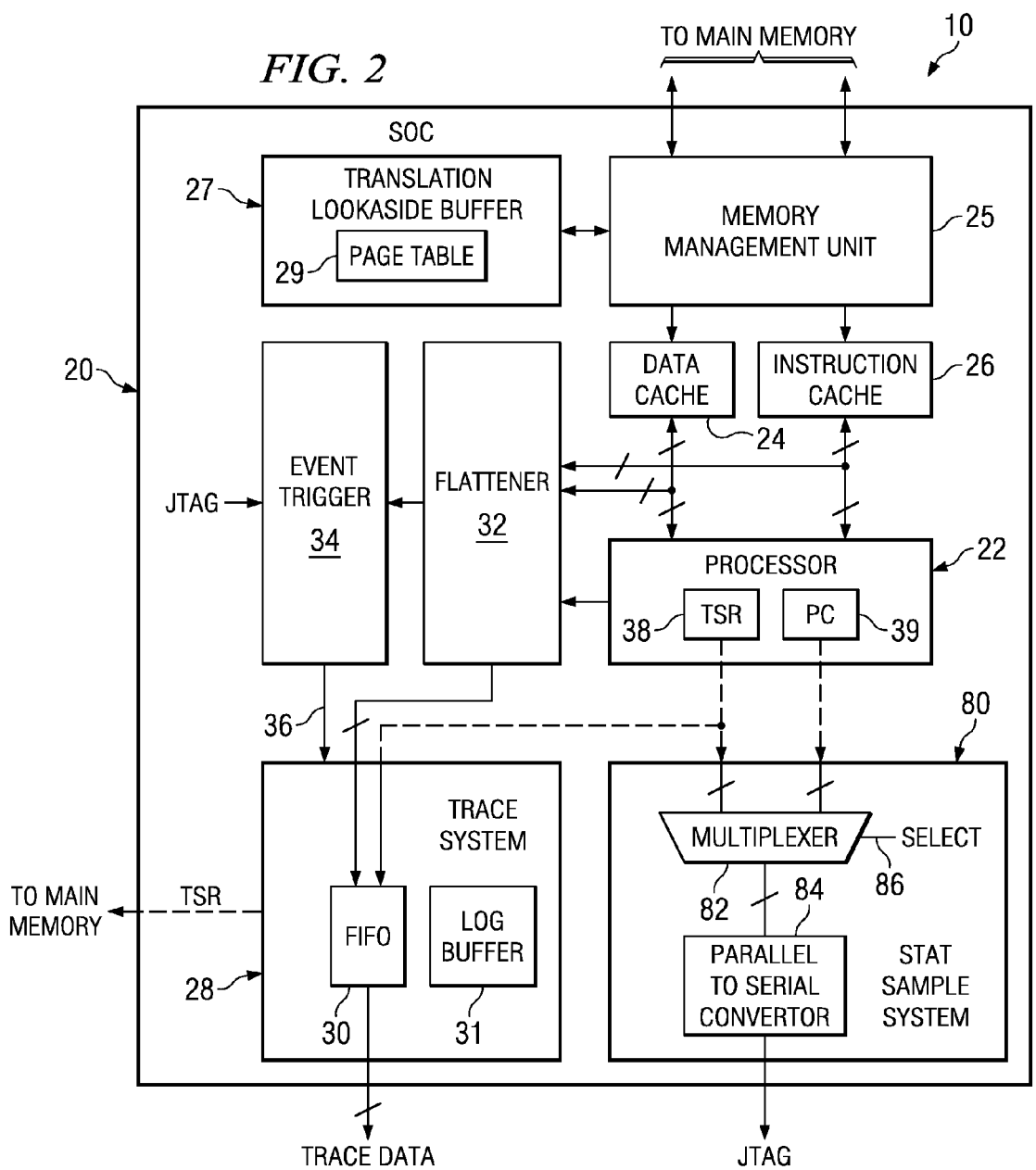
FIG. 2 shows, in greater detail, a target system in accordance with embodiments of the invention.

FIG. 2 shows in greater detail a portion of the target system 10. In particular, a target system 10 in accordance with at least some embodiments comprises a System-On-A-Chip (SOC) 20. The SOC 20 is so named because many devices that were previously individual components are now integrated on a single integrated circuit. For example, the SOC 20 may comprise one or more processors 22, data cache 24, instruction cache 26, and other devices (e.g., random access memory (RAM) and specialty processors such as digital signal processors). In order to be operational in system using virtual memory addressing, the SOC 20 also comprises a memory management unit (MMU) 25. The MMU 25 translates between virtual addresses (used by the processor) and physical addresses. In order to perform the translations, the MMU 25 looks to its translation lookaside buffer (TLB) 27, the TLB 27 being a set of hardware locations that store a page table 29 or a pointer to a page table that contains information correlating the virtual addresses to physical addresses.

In accordance with some embodiments, the SOC 20 also comprises a trace system 28. The trace system 28 comprises a First In-First Out (FIFO) buffer 30 in which trace data is gathered. When operating in the trace mode the trace data is sent to the host computer 12 (FIG. 1) by the trace system 28. Because the processor 22 may perform a plurality of parallel operations, in some embodiments the SOC 20 may also comprise a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; cache memory trace data; addresses of opcodes executed by the processor 22; the value of hardware registers in the processor 22; and interrupts received by the processor 22.

Still referring to FIG. 2, in some embodiments the integrated circuit SOC 20 may further comprise an event trigger system 34. The event trigger system 34 couples to the data flattener 32 and receives a least a portion of the serialized data. In response to various pre-programmed triggers (where such triggers may be communicated to the event trigger system 34 by way of JTAG-based communications), the event trigger system 34 asserts a trigger signal 36 to the trace system 28. In response, the trace system 28 accumulates trace data in its FIFO buffer 30 and sends the trace data to the host computer 12 (FIG. 1).

Referring simultaneously to FIGS. 1 and 2, a user of the host computer system 12 wishing to debug a software program executable on the target system 10 enables the event trigger system 34, possibly by JTAG-based communication over the serial cable 18. Thereafter, the user initiates the target program on the target system 10. The processor 22 executes the target program, while the data flattener 32 gathers pertinent information, serializes the information, and forwards it both the event trigger system 34 and the trace system 28. At points in time before the trace system 28 is enabled by the event trigger system 34, the data supplied to the trace system 28 by the flattener 22 may be ignored, discarded or collected such that the trace data comprises events just prior to the trigger. At a point in execution of the target or traced program, the trigger events occur and the trigger events are identified by the event trigger system 34, and the event trigger system 34 asserts the trigger signal 36 to the trace system 28.

In response to assertion of the trigger signal 36, the trace system 28 collects the trace data in the FIFO buffer 30 (possibly together with events that occur prior to the trigger). Simultaneously with collecting, the trace system 28 sends the trace data to the host computer 12. In embodiments where all or substantially all the events after the assertion of the trigger signal 36 are part of the trace data, the trace system 28 sends the trace data over the relatively high bandwidth multi-pin cable 16. Other embodiments comprise sending the data over an optical interconnect to the host computer, or logging the captured trace data in memory or disk that is accessible by the target processor where it can be accessed by another program running on the target processor (e.g., an embedded software debugging program). Some of the illustrative trace data may be values indicative of a plurality of states of virtual to physical memory mapping, which requires a brief digression into the relationship between virtual memory and physical memory.

Figure 3:
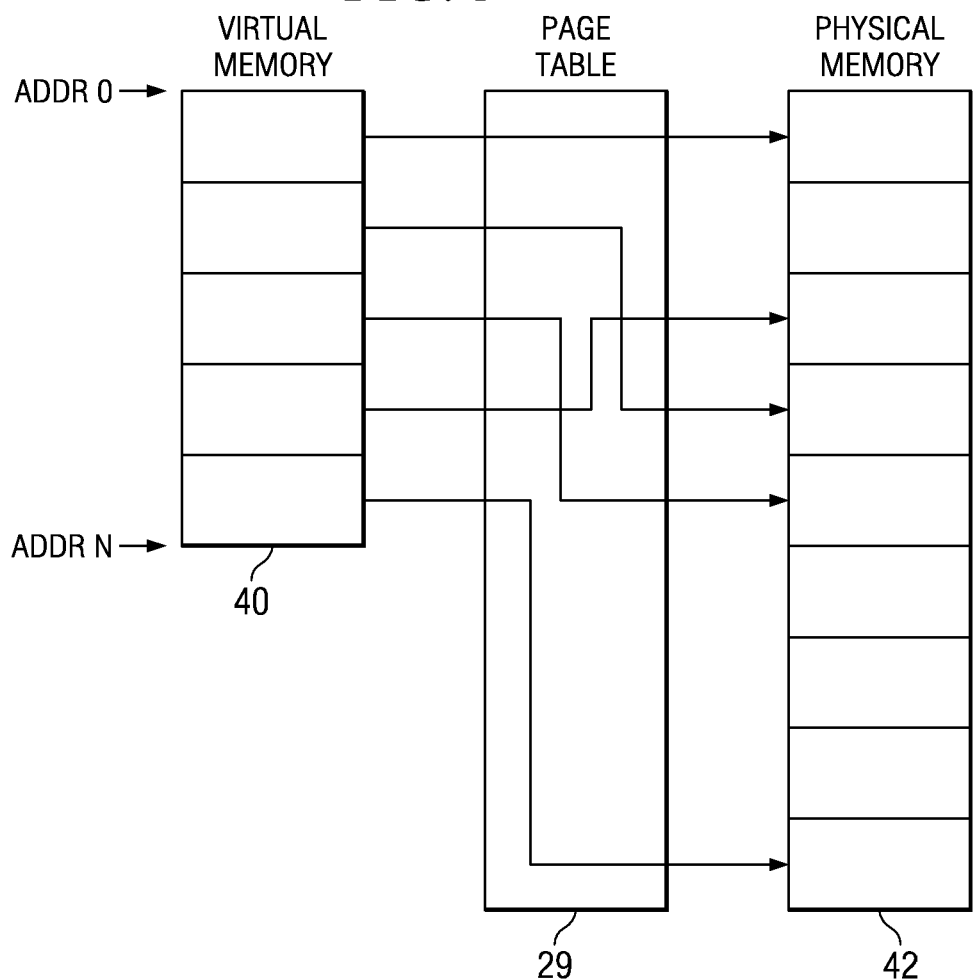
FIG. 3 conceptually shows the relationship between virtual memory and physical memory.

FIG. 3 conceptually shows the relationship between virtual memory and physical memory. In particular, FIG. 3 shows a virtual memory 40 and a physical memory 42. As illustrated, various portions of the physical memory 42 may be "mapped" to contiguous portions of the virtual memory 40. The physical memory 42 may comprise not only system main memory (e.g., RAM), but also other volatile and non-volatile storage devices (e.g., hard drives). Each task (comprising one or more functions, each function comprising instructions executed by the processor) uses a particular virtual to physical memory mapping, and each task may operate unaware of the physical locations of its utilized storage.

In order to keep track of the virtual to physical memory mapping, systems in accordance with embodiments of the invention utilize one more page tables (e.g., page table 29 (also FIG. 2)). Page tables are data structures that correlate the virtual memory mapping to the physical memory mapping. The MMU 25 uses the page table 29 as the mechanism to translate between virtual addresses (used by the processor) and the physical addresses to which those virtual addresses relate. Before execution of particular task, the operating system ensures the MMU 25 has the proper page table in its TLB 27. In some embodiments, each task has a dedicated page table, and prior to instantiating a new task the operating system informs the MMU of which page table to use (e.g., provides the page table to the MMU, or provides a pointer to the page table to the MMU).

In systems using virtual memory addressing by the processor, many tasks may execute from the same virtual memory addresses. Thus, when viewing addresses of executed opcodes executed on a processor that uses a virtual memory system (where the debug-trace program externally correlates object code versions of the programs to the executed addresses), there is no easily discernable difference between the multiple tasks as they are executed from the same virtual addresses.

In order to assist the user of the debug-trace program 13 executed on the host computer 12 in differentiating tasks, in some embodiments of the invention the trace system 28 is configured to insert into the trace data values indicative of a plurality of possible states of the virtual to physical memory mapping used by the memory management system. The debug-trace program 13 executing on the host computer 12 extracts the values indicative of virtual to physical memory mapping from the trace data, which enables the debug-trace program to identify which tasks were executed.

Still referring to FIG. 2, the trace system 28 obtains the indications of operating context from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, and referring briefly to FIG. 1, the SOC 20 may couple to a memory subsystem 21 which implements the target state register 23. In these alternative embodiments, the target state register 23 may be readable by a memory operation to an assigned address, and thus target state register 23 may be referred to as a memory addressable register. In yet still other embodiments, the memory subsystem 21 may be integrated with other devices of the SOC 20. The trace system 28 is configured to send the value in the target state register 23, 38 to the host computer 12 when the value in the target state register, or a portion thereof, is newly written.

In embodiments where the trace system 28 couples to the host computer 12 by way of the relatively high bandwidth connection, the trace system 28 is configured to monitor the value in the target state register 23, 38 and send the value to the host computer system 12 in a message wrapping protocol that identifies to the host computer 12 that the information is the value of the target state register 23, 38. Thus, in these embodiments the values in the target state register are sent across the high bandwidth cable 16 along with other trace data (e.g., direct memory access (DMA) trace data, cache memory trace data, addresses of opcodes executed by the processor 22 (the program counter values), the value of hardware registers in the processor 22, and interrupts received by the processor 22).

In accordance with at least some embodiments of the invention, when the operating system instantiates a new task and sets the page table for that particular task, the operating system also writes a value to the target state register 23, 38 that is indicative of the active page table. In embodiments where the number of possible page tables is low, the operating system writes the value indicative of the page table to the target state register 23, 38 in any predetermined fashion. The newly written target state register value is then sent to the host computer 12 for use by the debug-trace program 13. In situations where portions of the target state register 23, 38 are used for imparting other information, the various portions of the target state register 23, 38 may be divided into sections, one section applicable to indicating the virtual to physical memory mapping.

Figure 4:
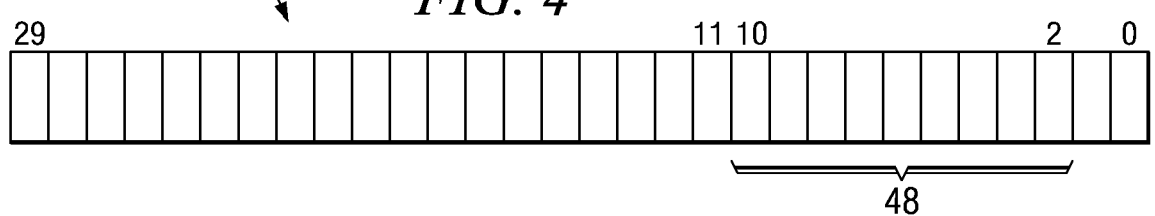
FIG. 4 shows a target state register in accordance with at least some embodiments.

FIG. 4 shows, at the bit level, a target state register 23, 38 in accordance with some embodiments of the invention. In particular, in order to differentiate values indicative of the state of the virtual to physical memory mapping that bits used for other purposes, the bits of the target state register may be logically divided with one grouping of bits applicable to the state of the virtual to physical memory mapping. For example, the grouping 48 (bits 2 through 10) may be dedicated to identifying the state of the virtual to physical memory mapping. With grouping 56 having nine bits, the grouping 56 may be used to identify $2^9$ possible page tables. Although FIG. 4 shows the target state register 23, 38 with nine bits dedicated to identifying the state of the virtual to physical memory mapping, any number of bits may be equivalently used. When the number of pages tables becomes large and/or when the bits of the target state register are dedicated to other purposes, alternative methods are used.

In order to address situations where there are a large number of page tables and/or the bits of the target state register 23, 38 are dedicated to other purposes, and in accordance with some embodiments, the operating system writes an indication of the state of the virtual to physical memory mapping to a log buffer. A log buffer may be equivalently referred to as a data table, data array and/or data structure. In some embodiments, data from the log buffer is read out by the host computer 12 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read by the host computer 12 one or more times during the trace period to ensure all the entries generated are available to the debug-trace program.

In some embodiments, the trace system 28, in addition to the FIFO buffer 30, implements a series of memory locations 31 (FIG. 2) to be the log buffer. In alternative embodiments, the log buffer is located in RAM, either on the SOC 20 or in separate RAM 21 (FIG. 1). Regardless of the precise location of the log buffer, the host computer 12 has access to the log buffer and can read data from the log buffer as described above.

The logical construction of the log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention at least some entries in the log buffer comprises an indication of the state of the virtual to physical memory mapping and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written by the operating system.

In addition to writing the indication of the state of the virtual to physical memory mapping and possibly the index value to the log buffer 31, the operating system in accordance with embodiments of the invention also places the index value in the target state register 23, 38. Writing the index value to the target state register contemporaneously with writing the log buffer ensures that the index value is present in the trace data associated with the traced program. In accordance with some embodiments, the debug-trace program 13 in host computer 12 reads the index value from the trace data, indexes into the log buffer data based on the index value, and thus obtains an indication of the active page table.

The debug-trace program 13 may read the page tables indicated by the target state register 23, 38, or the page tables indicated by the combination of an index value in the target state register 23, 38 and the log buffer 31. In some embodiments, the debug-trace program reads the indicated page table during execution of the traced program. In alternative embodiments, the debug-trace program 13 reads relevant page tables after execution of the traced program has stopped.

In other embodiments, rather than using a plurality of pre-constructed page tables, the operating system of the target system modifies the page table prior to instantiating each new task. In these embodiments, the operating system of the target system is configured to provide to the debug-trace program 13 an indication of the changes made to the page table. In some embodiments, the indication of the changes is written to the target state register 23, 38. In embodiments where the changes are too large to convey purely through the target state register 23, 38, the operating system may write the changes to the log buffer 31, and write an index value to the target state register 23, 38. The debug-trace program 13 may read the log buffer as the traced program is executing, or after execution of the traced program has stopped. Using the information (whether from the target state register 23, 38 directly, or from one or more entries in the log buffer), the debug-trace program 13 reconstructs the page table, and thus identifies the particular task executed during that period of the execution time. Attention now turns to how the debug-trace program 13 uses the information regarding the state of the virtual to physical memory mapping.

In software programs having multiple tasks, one or more of the tasks may consume excessive processor time and slow overall system performance. A debug-trace program in accordance with embodiments of the invention uses the values indicative of state of the virtual to physical memory mapping to identify which tasks (and their underlying functions, if any) have executed on the target processor to generate and display an indication of a proportion of an execution time the target processor dedicated to each task (and in some cases functions of a task) during the execution time.

Figure 5:
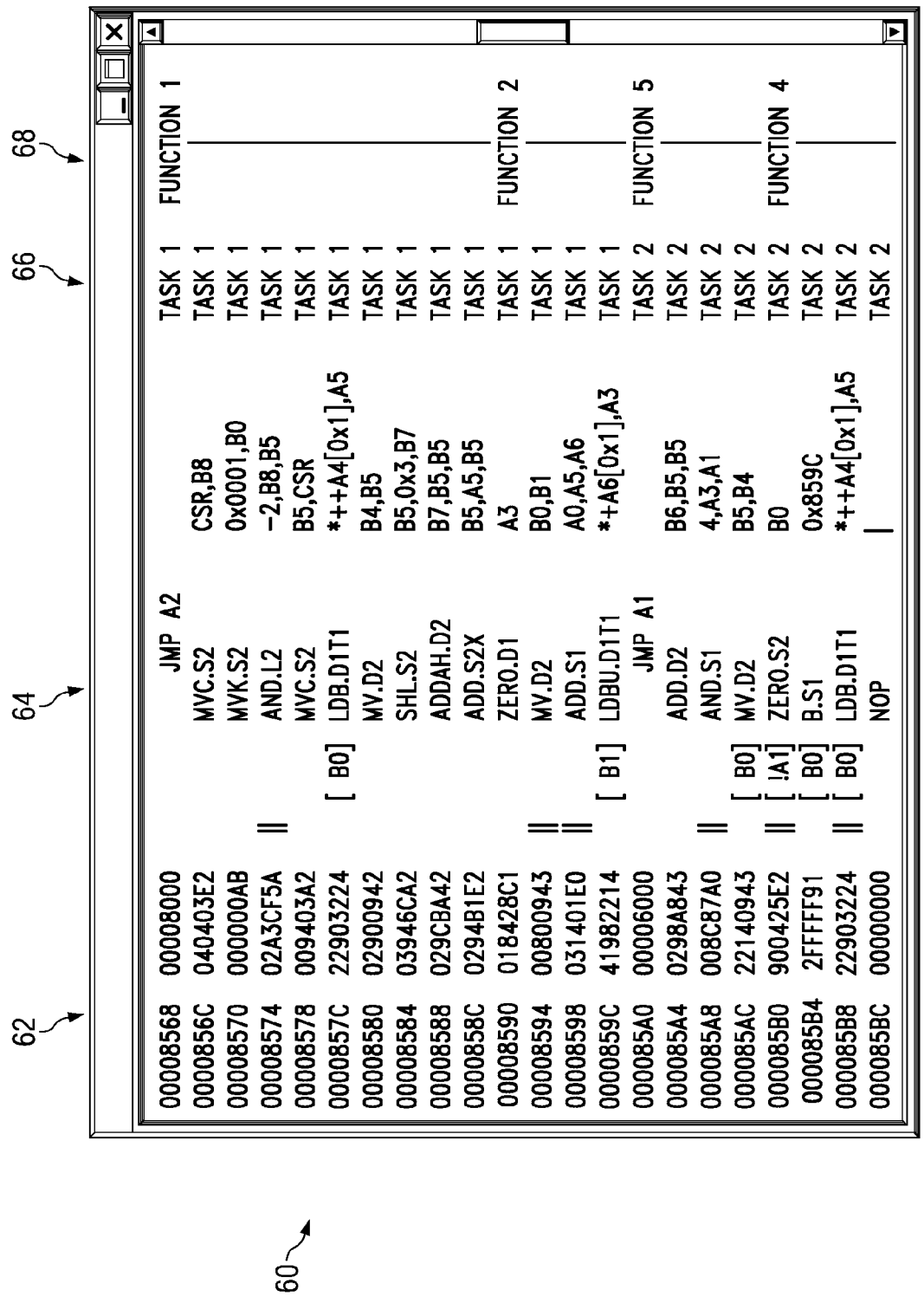
FIG. 5 shows a trace data screen in accordance with some embodiments of the invention.

FIG. 5 shows an illustrative trace data screen 60 that comprises an indication of the proportion of time the target processor dedicated to each of the plurality of tasks. In particular, the trace data screen of FIG. 5 illustrates addresses of executed instructions 60, along with the opcodes 64 of each instruction, and other information. The function that was being executed and the opcodes pertaining to each instruction may be determined by the debug-trace program 13 by correlating the addresses sent to the host computer 12 to object files of the traced program. FIG. 5 further illustrates that the debug-trace program 13 may also place in the trace data screen 60 an indication of to which of the task the addresses belong (and in some cases the function of the within the task). In particular, the trace data screen 60 comprises a column 66 which identifies the task, and a column 68 which identifies the function within the task. While only two tasks (and two functions each) are shown to have contributed to the trace data screen 60, any number of tasks (and any number of functions each) may have contributed and thus may be shown. Features of this view comprise: the ability to filter all entries except those for a desired task; and allowing the user to view the operation of the software executed by that task without having to skip past sections of the trace display where the task was either not active or was preempted.

Figure 6:
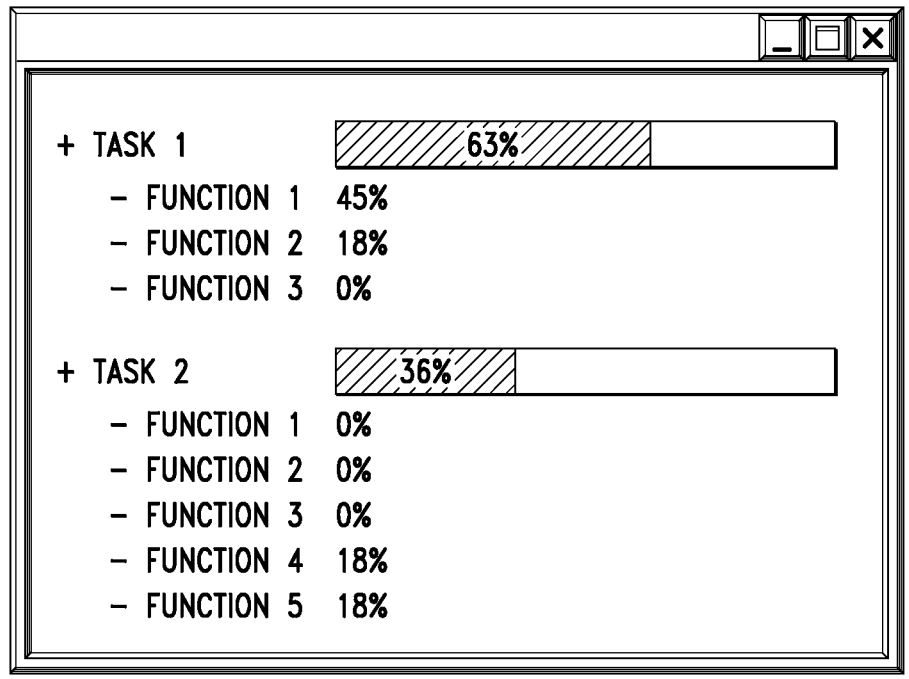
FIG. 6 shows profile screen in accordance with some embodiments of the invention.

Still referring to FIG. 5, for the illustrative twenty-two clock cycles illustrated (ignoring any stalls), task 1 occupied fourteen of the clock cycles, and task 2 occupied eight of the clock cycles. Thus, FIG. 5 also illustrates the proportion of time the target processor dedicated to each overlay program by the number of entries for each task in column 60, and the proportion of time for each function within a task in column 68. FIG. 6 illustrates an alternative profiling screen 70 which shows, for the period of time of the trace data screen 60 of FIG. 5, the percentage of the processor time dedicated to each task, the percentage shown in a bar graph form (with numerical equivalent embedded therein). The profiling screen also shows that the percentage of time spent by each function may also be displayed, in this case only by the numerical percentage. In alternative embodiments, all percentages may be shown as bar graphs with embedded numerical percentages, or just as numerical percentages.

The embodiments discussed to this point utilize trace data gathered by the trace system 28 and either stored in the target system for use by an embedded debugger, or transferred over one or both of serial cable 18 or the multi-pin cable 16; however, in alternative embodiments the SOC 20 either does not have the ability to gather all the pertinent trace data (e.g., a low cost SOC 20 that does not have the trace system 28, data flattener 32 and event trigger system 34), or the user of the debug-trace program 13 is interested in a smaller subset of the data (possibly in close to real time). Referring again to FIG. 2, in accordance with alternative embodiments the SOC 20 comprises a statistical sample system 20 which enables the alternative embodiments to utilize a method termed herein "statistical profiling."

When statistical profiling, the statistical sample system 80 is configured to periodically read the value of the program counter (which contains the address of the next opcode to execute) from the program counter register 39 and send the value of the program counter to the host computer 12. As discussed above, addresses alone may be insufficient to identify which task the addresses of the program counter represent. In order to address this concern, the alternative embodiments send the value in the target state register 23, 38 in place of the value of the program counter when the value (or a portion thereof) in the target state register 23, 38 is newly written with a value indicative of the state of the virtual to physical memory mapping.

FIG. 2 illustrates that the statistical sample system 80 comprises a multiplexer 82 and a parallel to serial converter 84. The statistical sample system 80 periodically reads a predetermined read address, in these embodiments the output signals of the multiplexer 82. The value from the predetermined read address is provided to the parallel to serial converter 84, and from there is sent to the host computer 12 (e.g., over the serial cable 18). In some embodiments the statistical sample system 80 may be "programmed" by the host computer 12 to periodically read the predetermined memory location, and thus the host computer 12 from that point forward receives the read values without further commands. In alternative embodiments, the host computer 12 may make a request (or read) for each read value.

Still referring to FIG. 2, and with regard to the value in the target state register 23, 38, the multiplexer of the statistical sample system 80 is configured to provide to the predetermined read location the value of the program counter register 39, unless the value of the target state register 23, 38 (or portion thereof) has changed since the last send of the value of the target state register. If the target state register 23, 38 has been written since the last send of the value of the target state register 23, 38 (e.g., an operating system writes an indication of an newly active page table), then the multiplexer select signal 86 is asserted. On the next read of the predetermined memory address, the value of the target state register is present at the output of the multiplexer 82, and thus the host system is supplied the value of the target state register 23, 38. After the read, but before the next read to the predetermined read address, the statistical sample system de-asserts the select signal 86.

Differentiating the program counter value from the value of the target state register in the host computer 12 takes advantage of the fact that in accordance with at least some embodiments the target system 10 operates based on 16 bit (two byte) instructions aligned on even byte boundaries. Thus, the value of the program counter in accordance with these embodiments consistently has an even value, meaning that the least significant bit of the program counter is zero. In order to differentiate a program counter value from a value from the target state register, the least significant bit of the value of the target state register is assigned to be a logic "1". Other systems for differentiating program counter values from values of the target state register may be equivalently used.

Using these tools, the host computer 12 (and in particular the debug-trace program 13) may get a statistical sample of values of the program counter during execution of the traced program, and each value of the target state register 23, 38 during the executed program. The program counter values associated with the task identified by the preceding target state register value may be correlated with symbol information associated with the program and software modules that are being executed by that task in order to determine the relative amount of time spent in each of that task's functions. From this information, the debug-trace program 13 builds a display having an indication of a proportion of an execution time of the target processor dedicated to each task (and/or function within each task). Although not as exact as the embodiments where each executed address is captured, the embodiments performing statistically sampling still may generate and display indications, such as illustrated in FIG. 6.

In situations where the value indicative of the identity of each task is written directly to the target state register, these embodiments enable a substantially real time view of the proportion of the execution time the target processor dedicates to each task (provided the debug-trace program already has copies of the page tables). In embodiments where the debug-trace program has to read the page tables, or the value in the target state register 23, 38 is an index value to a log buffer, the host computer 12 may substantially simultaneously read the log buffer (e.g., log buffer 31) and page tables, and build the display. In yet still other embodiments, the host computer 12 may read the values at the predetermined read location, but not read the log buffer and page tables until after execution of the traced program has stopped, and thus the illustrative displays may be constructed after the host computer 12 has read the log buffer.

Figure 7:
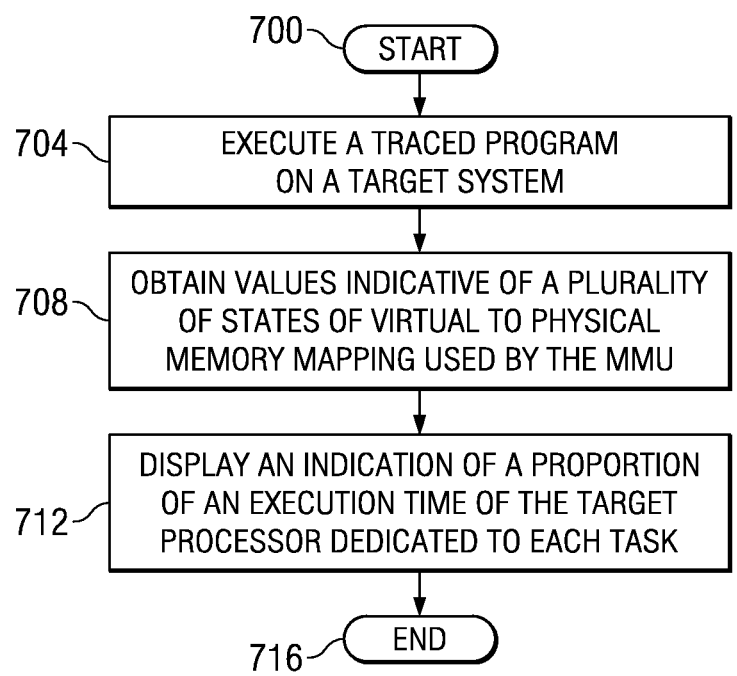
FIG. 7 shows a method in accordance with embodiments of the invention.

FIG. 7 illustrates a method (e.g., software) in accordance with embodiments of the invention. In particular, the process starts (block 700) and proceeds to executing a traced program on a target system (block 704), the traced program comprising a plurality of tasks, each task using a different virtual to physical memory mapping. Thereafter, the method comprises obtaining values indicative of which of the plurality of states of virtual to physical memory mapping are used by a MMU (block 708). In some embodiments, obtaining the values involves extracting values directly from the trace data (e.g., sent from the target system 10 to the host computer 12) which identify particular page tables used. In other embodiments, the values in the trace data are index values to entries in a log buffer, which log buffer may be read contemporaneously with the execution of the traced program, or after execution has stopped. In some embodiments, the entries in the log buffer directly indicate the particular page tables used, and in alternative embodiments the entries in the log buffer identify changes made to the page table to accommodate a particular task. In yet still other embodiments, obtaining the values indicative of which of the plurality of overlay programs executed involves statistically sampling a predetermined read location, where the read location provides the value of the program counter, unless the value of the target state register has been newly written.

Regardless of the precise mechanism by which the values indicative of the state of virtual to physical memory mapping are acquired, the next illustrative step is displaying an indication of a proportion of an execution time of the target processor was dedicated to each task (block 712), and thereafter the method ends (block 716). In embodiments where the host computer 12 receives a full set of trace data, displaying the indication may involve creating columns in the displayed trace data (such as columns 66 and 68 of FIG. 5) which shows how each executed instruction relates to the task and/or function. The embodiments where the values indicative of the state of virtual to physical memory mapping are delivered as part of the trace data may also generate a display that shows, on a percentage basis, the time dedicated to each task and, optionally, some or all of the functions executed by that task such as shown in FIG. 6. Moreover, in embodiments where the program counter and target state register are statistically sampled may also generate a display that shows, on a percentage basis, the time dedicated to each task and, optionally, some or all of the functions executed by that task, such as shown in FIG. 6.

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable medium for storing a software program to implement the method aspects of the invention. The computer readable medium could be, for example, a volatile memory, a non-volatile memory, a compact disc read only memory (CDROM), an electrically erasable programmable read only memory (EEPROM), a hard drive, and the like.

The above discussion is meant to be illustrative of the principles and various embodiments of the present invention. Numerous variations and modifications will become apparent to those skilled in the art once the above disclosure is fully appreciated. For example, although the discussion has assumed that the operating system is responsible for writing the target state register and/or the log buffer, in alterative embodiments the task and/or function itself may write the pertinent information when executed. It is intended that the following claims be interpreted to embrace all such variations and modifications.

What is claimed is:

1. A computer-readable medium storing a program that, when executed by a processor of a host system, causes the processor to:
   obtain values indicative of a plurality of states of virtual to physical memory mapping used by a memory management unit associated with a processor of a target system, wherein the host system obtains the values from trace data, the trace data captured while a traced program executes; and
   display an indication of a proportion of an execution time the processor of the target system dedicated to each of a plurality of tasks during the execution time, each task associated with a particular state of the virtual to physical memory mapping.

2. The computer-readable medium as defined in claim 1 wherein when the program obtains the values the program causes the processor of the host system to one or more selected from the group: obtain the values from trace data sent to the host system; and obtain the values from trace data gathered and stored by the processor of the target system, and wherein the processor of the host system and the processor of the target system are the same processor.

3. The computer-readable medium as defined in claim 1 wherein when the program obtains the values the program obtains an indication of which of a plurality of page tables was active.

4. The computer-readable medium as defined in claim 3 where the program causes the processor of the host system to one selected from the group:
   obtain a copy of an active page table while the processor of the target system executes the traced program; and
   obtain a copy of the active page table after the traced program has stopped execution.

5. The computer-readable medium as defined in claim 1 wherein when the program obtains the values the program causes the processor of the host system to obtain values indicative of changes to the virtual to physical memory mapping for each of the plurality of tasks.

6. The computer-readable medium as defined in claim 1 further comprising:
   wherein when the program obtains the values the program obtains an index value into a log buffer within the target system; and
   wherein the program causes the processor of the host system to:
     obtain the log buffer from the target system;
     identify an entry in the log buffer indicated by the index value; and
     identify the state of the virtual to physical memory mapping based on the entry.

7. The computer readable medium as defined in claim 6 wherein when the program obtains values the program causes the processor of the host computer to obtain the values by reading the log buffer, the log buffer comprising one or more selected from the group: an indication of changes to the virtual to physical memory mapping; and an indication of which of a plurality of page tables was active.

8. The computer readable medium as defined in claim 6 wherein when the program obtains values the program causes the processor of the host computer to obtain the values by one ore more selected from the group: read the log buffer one or more times during the execution time; and read the log buffer after the traced program has ceased execution.

9. The computer-readable medium as defined in claim 1 wherein when the program obtains the values the program causes the processor of the host computer to periodically receive a value from predetermined read location within the target system while the traced program is executing, wherein the predetermined read location contains one selected from the group: a value indicative of which of a plurality of states of virtual to physical memory mapping was active; and a value of the program counter of the processor of the target system.

10. The computer-readable medium as defined in claim 9 further comprising:
    wherein when the program obtains the value the program obtains an index value into a log buffer within the traced system; and
    wherein the program causes the processor of the host system to:
      obtain the log buffer from the target system;
      identify an entry in the log buffer indicated by the index value; and
      identify an active virtual to physical mapping based on the entry.

11. The computer readable media as defined in claim 1 wherein when the program displays the indication the program causes the processor of the host computer to display a graphical representation of a proportion of the execution time dedicated to each of the plurality of tasks.

12. The computer readable media as defined in claim 11 wherein when the program displays the indication the program causes the processor of the host computer to display a graphical representation of a percentage of the execution time dedicated to each of the plurality of tasks.

13. A method comprising:
    executing a traced program on a target system, the traced program comprising a plurality of tasks, each task using a different virtual to physical memory mapping;
    obtaining values indicative of a plurality of states of virtual to physical memory mapping used by a memory management unit associated with a processor of the target system, wherein obtaining further comprises obtaining the values from trace data, the trace data captured while the traced program is executing; and
    displaying an indication of a proportion of an execution time the processor of the target system dedicated to each of a plurality of tasks during the execution time.

14. The method as defined in claim 13 wherein obtaining further comprises one or more selected from the group: obtaining the values from trace data sent to a host system; and obtaining the values from trace data gathered and stored by the processor of the target system, and wherein a processor of the host system and the processor of the target system are the same processor.

15. The method as defined in claim 13 wherein obtaining further comprises obtaining values indicative of changes to the virtual to physical memory mapping for each of the plurality of tasks.

16. The method as defined in claim 13 further comprising:
    wherein obtaining further comprises obtaining an index value into a log buffer within the target system; and
    obtaining the log buffer from the target system;
    identify an entry in the log buffer indicated by the index value; and
    identify the state of the virtual to physical memory mapping based on the entry.

17. The method as defined in claim 16 wherein obtaining further comprises obtaining the values by reading the log buffer, the log buffer comprising one or more selected from the group: an indication of changes to the virtual to physical memory mapping; and an indication of which of a plurality of page tables was active.

18. The method as defined in claim 13 wherein obtaining further comprises periodically receiving a value from predetermined read location within the target system while the traced program is executing, wherein the predetermined read location contains one selected from the group: a value indicative of which of a plurality of states of virtual to physical memory mapping was active; and a value of the program counter of the processor of the target system.

19. The method as defined in claim 18 further comprising:
wherein obtaining further comprises obtaining an index value into a log buffer within the traced system;
obtaining the log buffer from the target system;
identifying an entry in the log buffer indicated by the index value; and
identifying an active virtual to physical mapping based on the entry.

20. The method as defined in claim 13 wherein displaying further comprises displaying a graphical representation of a proportion of the execution time dedicated to each of the plurality of tasks.

21. The method as defined in claim 20 wherein displaying further comprises displaying a graphical representation of a percentage of the execution time dedicated to each of the plurality of tasks.

22. The method as defined in claim 20 wherein displaying further comprises displaying a graphical representation of a proportion of the execution time dedicated to each of the software procedures executed by each of the tasks.

23. The method as defined in claim 20 wherein displaying further comprises displaying a graphical representation of a percentage of the execution time dedicated to each of software procedures executed within the plurality of tasks.

* * * * *